United States Patent
Dahl et al.

(10) Patent No.: US 7,159,684 B2
(45) Date of Patent: Jan. 9, 2007

(54) INTERLOCK CONTROL SYSTEM ON WHEELED WORK MACHINE

(75) Inventors: Jeffrey A. Dahl, Lincoln, ND (US); Timothy Bock, Bismarck, ND (US)

(73) Assignee: Clark Equipment Company, Montvale, NJ (US)

(*) Notice: Subject to any disclaimer, the term of this patent is extended or adjusted under 35 U.S.C. 154(b) by 370 days.

(21) Appl. No.: 10/715,627

(22) Filed: Nov. 18, 2003

(65) Prior Publication Data

US 2005/0034913 A1  Feb. 17, 2005

Related U.S. Application Data

(60) Provisional application No. 60/444,863, filed on Feb. 4, 2003, provisional application No. 60/429,537, filed on Nov. 27, 2002.

(51) Int. Cl.
*B60R 21/02* (2006.01)
(52) U.S. Cl. ........................ 180/271; 280/748
(58) Field of Classification Search ............... 180/271, 180/272, 273, 279, 281, 286, 289, 53.1, 53.8; 280/748, 756; 307/10.1
See application file for complete search history.

(56) References Cited

U.S. PATENT DOCUMENTS

| | | | |
|---|---|---|---|
| 2,362,994 A | 11/1944 | Frost | 214/78 |
| 2,429,170 A | 10/1947 | Royle | 214/78 |
| 2,457,400 A | 12/1948 | Roos | 180/48 |
| 2,459,473 A | 1/1949 | Troutman | 214/78 |
| 2,569,053 A | 9/1951 | Healy | 214/111 |
| 2,712,876 A | 7/1955 | Kuehn, Jr. | 214/78 |
| 2,818,983 A | 1/1958 | Freni | 214/78 |
| 2,845,192 A | 7/1958 | Klaus | 214/78 |
| 3,356,240 A | 12/1967 | Zink | 214/501 |
| 3,378,094 A | 4/1968 | Myers | 180/64 |
| 3,472,405 A | 10/1969 | Bowman et al. | 214/501 |
| 3,672,521 A | 6/1972 | Bauer et al. | 214/145 |
| 3,732,996 A | 5/1973 | Bauer | 214/152 |
| 3,811,581 A | 5/1974 | Van Der Lely | 214/131 |
| 4,056,204 A | 11/1977 | Spasuik | 214/83.3 |
| 4,388,980 A * | 6/1983 | Vig et al. | 180/271 |
| 4,397,371 A * | 8/1983 | Lynnes et al. | 180/271 |
| 4,698,150 A | 10/1987 | Wigoda | 209/421 |
| 4,828,071 A | 5/1989 | Gaede | 180/291 |
| 5,240,366 A * | 8/1993 | Bamford | 414/686 |
| 5,383,532 A | 1/1995 | Shonai et al. | 180/269 |
| 5,390,759 A | 2/1995 | Gollner | 180/307 |
| 5,425,431 A * | 6/1995 | Brandt et al. | 180/273 |
| 5,542,493 A | 8/1996 | Jacobson et al. | 180/272 |
| 5,860,488 A | 1/1999 | Kim | 180/271 |
| 5,938,237 A * | 8/1999 | Abels | 280/753 |
| 5,984,040 A * | 11/1999 | Lee | 180/271 |
| 6,135,230 A | 10/2000 | Schenck et al. | 180/273 |
| 6,169,950 B1 | 1/2001 | Parigger | 701/53 |

(Continued)

*Primary Examiner*—Paul N. Dickson
*Assistant Examiner*—Drew J. Brown
(74) *Attorney, Agent, or Firm*—Leanne R. Taveggia; Westman, Champlin & Kelly, P.A.

(57) ABSTRACT

A control system for a work machine is provided and includes an operator actuable input assembly and a sensor coupled to the input assembly. The sensor is configured to provide a signal indicative of operator presence on an operator platform. The control system also includes a controller operably coupled to the sensor and configured to receive the signal provided by the sensor. The controller is further configured to manipulate at least one function of the work machine based on the signal.

19 Claims, 9 Drawing Sheets

U.S. PATENT DOCUMENTS

| | | | |
|---|---|---|---|
| 6,182,781 B1 | 2/2001 | Beom | 180/271 |
| 6,299,207 B1* | 10/2001 | Bares | 280/748 |
| 6,557,893 B1* | 5/2003 | Sauermann | 280/748 |
| 6,732,829 B1* | 5/2004 | Bares | 180/271 |
| 6,902,024 B1* | 6/2005 | Miiller et al. | 180/271 |
| 7,007,768 B1* | 3/2006 | Nishi et al. | 180/273 |
| 2003/0136599 A1* | 7/2003 | Sauermann | 180/271 |

\* cited by examiner

INTERLOCK CONTROL SYSTEM ON WHEELED WORK MACHINE

The present application is based on and claims the benefit of U.S. provisional patent application Ser. No. 60/429,537, filed Nov. 27, 2002, and U.S. provisional patent application Ser. No. 60/444,863, filed Feb. 4, 2003, the content of which are hereby incorporated by reference in their entirety.

BACKGROUND OF THE INVENTION

The present invention relates to power machinery. More particularly, the present invention relates to a control system for a work machine. Although compact tractors, skid steer loaders and other types of wheeled work machines have enjoyed great success and are used throughout the world in a number of different applications, these machines are not well suited for all work environments. For example, compact tractors, while useful in some applications, frequently have a number of characteristics, which limit their usefulness in other applications. Typically, compact tractors have poor visibility to the front (i.e., toward the bucket). Compact tractors also typically have limited hydraulic systems for operation of attachments, and the attachments are frequently behind the operator, forcing the operator to turn around to see them. Further, for the operator of the compact tractor, entry/egress is often awkward or difficult and usually the tractor only provides seating for a single person. Also, compact tractors lack a cargo area, which severely limits their usefulness in many applications. Other common limitations of compact tractors include a relative lack of stability and the rough ride provided by many compact tractor designs.

Utility carts are another type of wheeled work machine, which have a number of characteristics that limit their usefulness in some applications. For example, utility carts do not have a loader option, and typically have limited or no attachment capability. Also, utility carts generally have limited, if any, onboard hydraulic systems for the operation of hydraulic attachments. Other typical characteristics of utility carts, which limit the applications in which they can be used, include a relatively large turning diameter and a limited ability to carry cargo. Utility carts are frequently low on power needed to pull equipment or carry cargo.

In many applications, a small turning diameter would be a beneficial feature of a wheeled work machine. However, many wheeled work machines, if not most, do not have small turning diameters. Thus, to change direction of travel, these machines need to stop, change direction, reorient the machine, and proceed in the intended direction. Typically, machines with front steerable wheels (for example, tractors and most utility vehicles) have to maintain a short wheelbase in order to maintain a small turning diameter, as wheelbase and turning diameter are inversely proportional. However, a short wheelbase has a negative effect by decreasing lift capacity, operator area, cargo area, etc.

Most compact tractors maintain a relatively small turning diameter by turning the front wheels extremely sharply and generally having a shorter wheelbase. Turning the wheels excessively sharp can be damaging to sensitive grounds such as lawns and turf areas. Further, even with a short wheelbase (and the disadvantages which result), the relatively small turning diameter of compact tractors may not be small enough for some applications. Most utility carts have a large turning diameter, which is unacceptable for many applications, due to the fact that they cannot turn the wheels as sharply as a typical tractor and that they require a longer wheelbase to place the operator seating, engine, cargo area, etc. A wheeled work machine which provides a small turning diameter without the disadvantages associated with the short wheelbase of tractors, would be a significant improvement in wheeled work machine applications.

Generally, wheeled work machines such as compact tractors, utility carts, and other types have numerous limitations, which prevent them from being suited for some applications. Some of these limitations are discussed above with reference to compact tractors and utility vehicles, but they may apply to other types of work machines as well. In addition to turning diameter characteristics, a common limitation in many wheeled work machines is a general inability to carry more than one person to a work site. Other limitations include an inability to carry cargo, poor visibility, lack of attachments such as a bucket or loader, low power, and instability, to name a few.

Further, many such machines have no mechanism for sensing operator presence or operator position.

Skid steer loaders have proven to be highly useful in many applications. Skid steer loaders have features, which are often highly beneficial for certain work environments. For example, skid steer loaders can support a wide variety of work tools and attachments. Skid steer loaders can also be turned very sharply. Numerous other features of skid steer loaders provide these machines with highly advantageous capabilities. Although skid steer loaders have enjoyed great success and are used throughout the world in a number of different applications, the skid steer loader is not well suited for all work environments.

There is thus a continuing need for an improved wheeled work machine. A machine that addresses one, several or all of the deficiencies discussed above would be particularly advantageous.

SUMMARY OF THE INVENTION

In one aspect, the present invention is directed towards a control system for a work machine. The control system includes an operator acutable input assembly and a sensor coupled to the input assembly. The sensor is configured to provide a signal indicative of operator presence on an operator platform. The control system also includes a controller operably coupled to the sensor and configured to receive the signal provided by the sensor. The controller is further configured to manipulate at least one function of the work machine based on the signal.

In another aspect, the present invention is directed towards work machine that includes a rigid frame and a cab coupled to the rigid frame and defining an operator compartment. The operator compartment has an operator platform. In addition, the work machine includes a mounting bracket coupled to a portion of the operator platform and an armrest pivotally coupled to the mounting bracket at a pivot point. The work machine also includes a sensor positioned on the mounting bracket. The sensor is configured to sense operator presence on the operator platform and to provide a signal indicative thereof.

DETAILED DESCRIPTION OF THE PREFERRED EMBODIMENT

Overview of one Example of a Wheeled Work Machine

The present invention is directed to an operator presence sensor and related control system for controlling a wheeled work machine, including acceleration, deceleration and braking control as well as speed control. An exemplary embodiment of a wheeled work machine 10 is illustrated in a number of the Figures which will be variously referred to herein as different aspects of the wheeled work machine are discussed. While the present invention deals with an operator presence sensor used in controlling a work machine, the exemplary embodiment of a work machine is discussed first for the sake of completeness. It should be noted that the present invention could just as easily be applied in the context of a tracked work machine (e.g., tracks instead of wheels).

Figure 1:
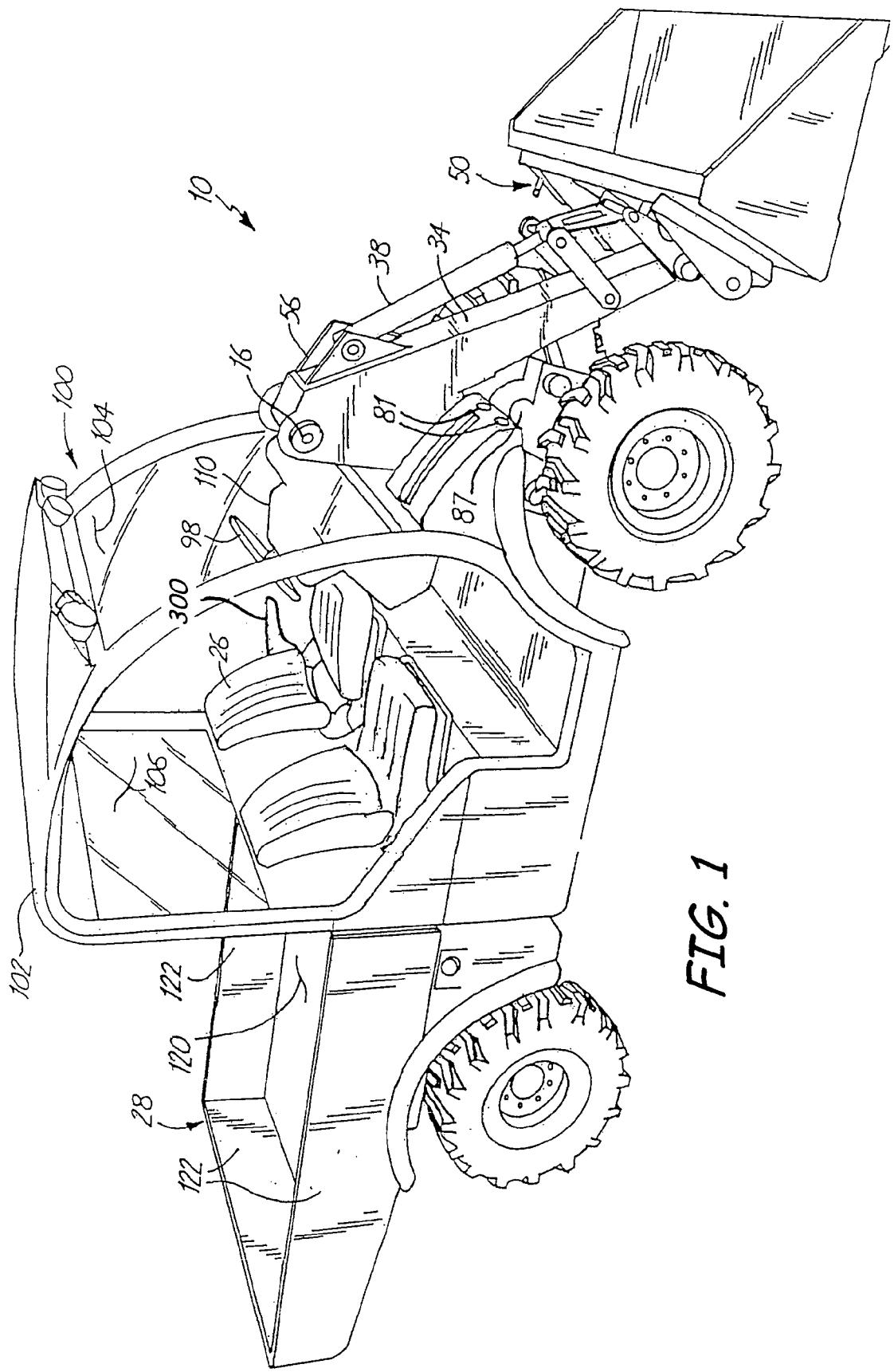
FIG. 1 is a perspective view of a wheeled work machine of the present invention.
Figure 2:
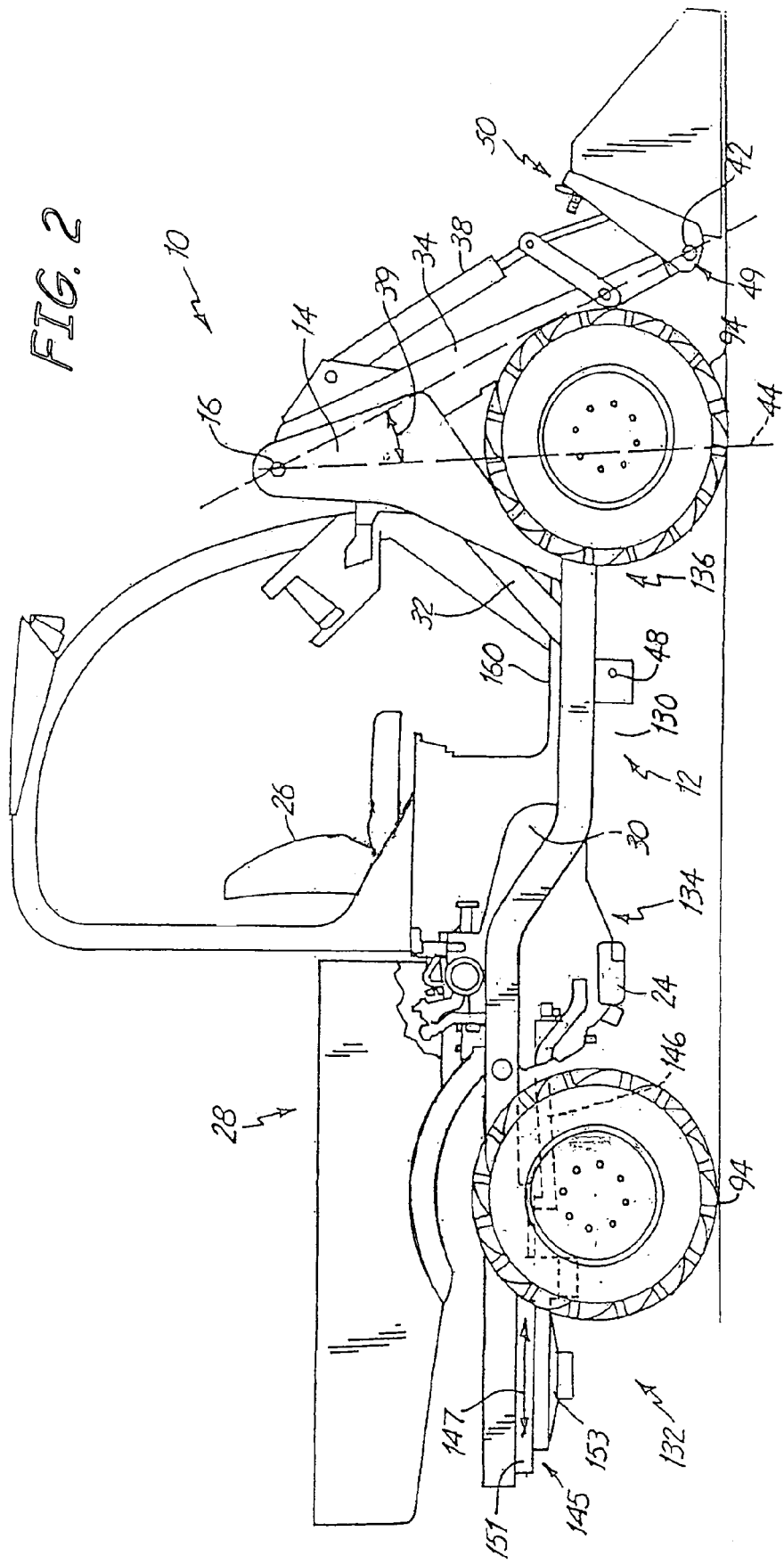
FIG. 2 is a side elevational view of the wheeled work machine with portions removed.
Figure 3:
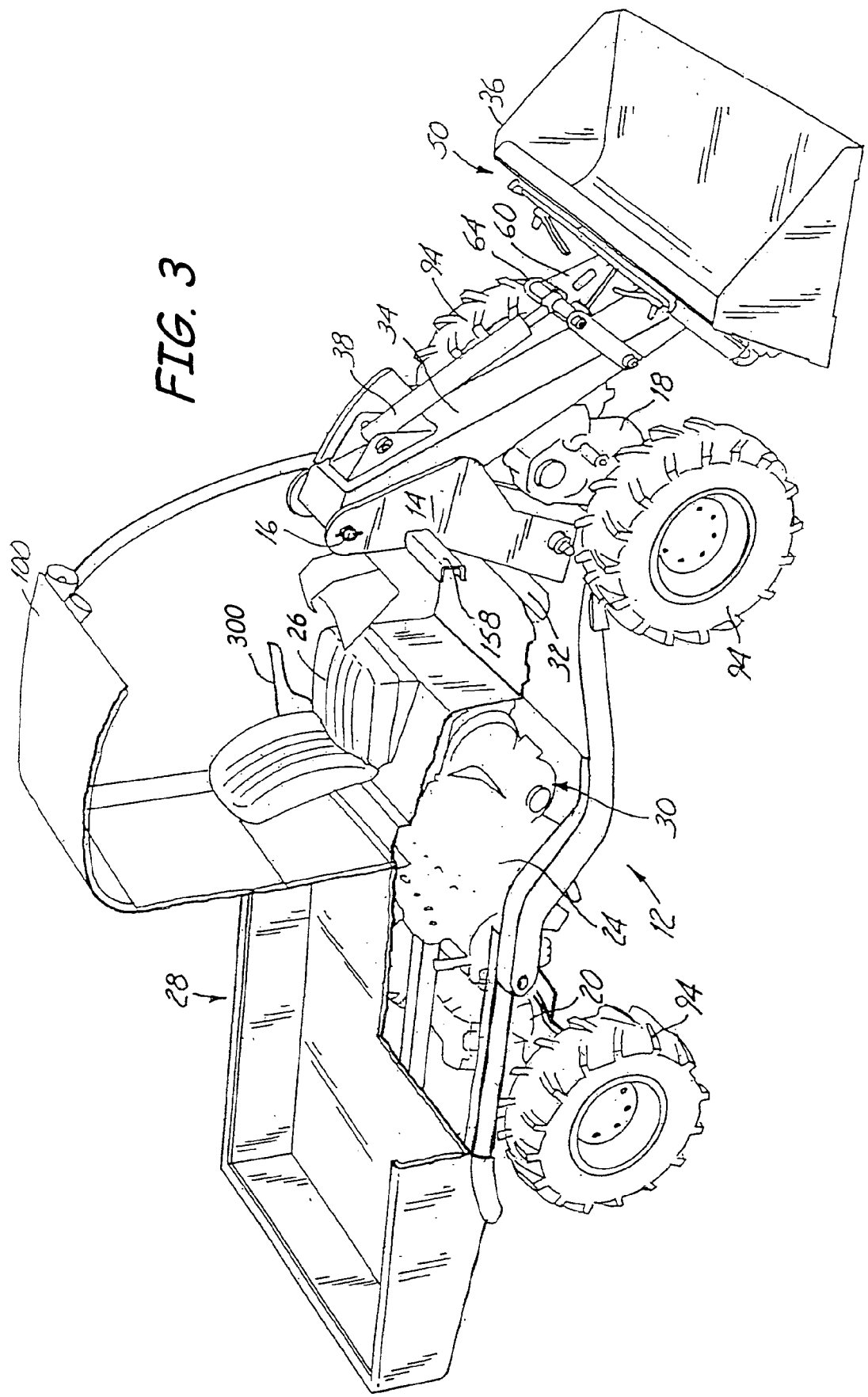
FIG. 3 is a perspective view of the wheeled work machine with portions removed.

An exemplary embodiment of a wheeled work machine 10 of the present invention is illustrated in FIGS. 1, 2 and 3. The wheeled work machine 10 includes a rigid frame assembly 12 having a support 14 with a boom pivot 16. A front wheel assembly 18 is joined to the frame assembly 12 proximate the support 14. Similarly, a rear wheel assembly 20 is joined to the frame assembly 12 at an end thereof remote from the support 14.

The wheeled work machine 10 further includes an engine 24, an operator platform 26 (herein embodied as a seat) and a cargo support 28. Each seat is shown with an armrest 300 on the outside of the seat 26. Of course, armrest 300 could also be mounted on both sides of seat 26 as well.

Location of these elements in combination with the support 14 for the boom pivot 16 provides a unique, multi-purpose machine that is compact and usable in a number of different applications. In particular, the operator platform 26 is located behind the support 14 and between the boom pivot 16 and the engine 24. In addition, the cargo support 28, which is also supported by the frame assembly 12, is located behind the operator platform 26 and, in one embodiment, over at least a portion of the engine 24. In the embodiment illustrated, the engine 24 is coupled to a hydraulic pump 30, which in turn, is coupled to a lift cylinder 32. Under selective control by the operator, the lift cylinder 32 can be used to tilt a lift arm 34 that is pivotally coupled at the boom pivot 16. In a manner discussed below, various tools can be attached to the lift arm 34 to perform various work functions at a position convenient for forward viewing by the operator sitting in operator platform 26. For instance, as illustrated, a bucket 36 can be coupled to a remote end 49 of the lift arm 34 and used to scoop or lift various types of materials. As illustrated and discussed below, a tilt cylinder 38 can also be coupled between the lift arm 34 and the bucket 36, which allows the bucket 36 to be pivoted relative to the lift arm 34. It should be noted however that the bucket 36 is but one exemplary tool that can be used with the wheeled work machine 10. The wheeled work machine 10 can include a single lift arm or boom 34 pivotally joined to the boom pivot 16. Use of a single lift arm 34 provides a stable, strong lifting device, but also minimizes obstruction to the remote end of the lift arm 34 as viewed by the operator sitting in operator platform 26. Nevertheless, although illustrated as a single lift arm 34, those skilled in the art can appreciate that additional lift arms can be used, for instance, in a side-by-side relationship from the support or supports 14 disposed in front of the operator platform 26.

As illustrated, the lift arm 34 extends between a line between wheels of the front wheel assembly 18. In one embodiment, a minimum angle 39 formed between the boom pivot 16 and a second boom pivot 42 typically provided at a remote end of the lift arm 34 and a normal reference line 44 from the boom pivot 16 to a level ground surface is in the range of 20 to 35 degrees and in a further embodiment in the range of 22–28 degrees.

Using a rigid lift arm 34 between pivots 16 and 42 enables the bucket 36 to move forwardly during lifting from the initial angle 39 described above. The forward movement of the bucket 36 allows an operator to easily fill the bucket 36 without requiring the wheeled work machine 10 to move forward during lifting. Due to the path taken by the bucket 36, the bucket 36 is filled during, approximately, the first 65 degrees of travel. Although many forms of loaders have the capability to raise a loaded bucket, many do not have the required traction or power to push the bucket completely into a pile of heavy material. Likewise, because many buckets lift primarily vertically, due to the long extension of the booms or lifting arms, many machines do not have the ability to lift a full bucket through the material that is above the bucket in view that that bucket was driven into the pile. In contrast, the large forward component of bucket movement during lifting enables the bucket 36 to be easily filled with rotation of the lift arm 34 and attachment leveling. In one embodiment, the lift arm 34 pivots through an arc of 102 degrees from its initial starting position. In this manner, once the bucket 36 is filled, the bucket 36 moves away from the pile of material. The use of a single boom support 14 and a single lift arm 34 is particularly beneficial because this construction enables a compact assembly of the work machine 10 and also provides excellent viewing of the remote end of the lift arm 34 for the operator sitting in the operator platform 26.

In one embodiment, the height of the pivot 16 with respect to a level ground surface is in the range of 48 to 54 inches, for example, 50.94 inches when angle 39 is 27.5. Other dimensions include the position of pivot 42 with respect to pivot 16 (55 to 49 inches, preferably 51.83 inches when angle 39 is 27.5) and the height of pivot 42 above the ground (2 to 8 inches, preferably 5 inches when angle 39 is 27.5) Similarly, the position of pivot 48 with respect to pivot 16 is in the range of 42.5 to 48.5 inches, preferably 45.5 inches when angle 39 is 27.5, and the height of pivot 48 above the ground is in the range of 9 to 15 inches, preferably 12 inches when angle 39 is 27.5. Likewise the position of the lift cylinder connection (pivot 47) to lift arm 34 with respect to pivot 16 inches is 13 to 19 inches, preferably 16 inches when angle 39 is 27.5, while the length of the lift arm 34 (from pivot 16 to pivot 42) is also 49 to 55 inches, preferably 51.83 inches when angle 39 is 27.5.

As discussed above, the lift cylinder 32 is operably coupled between the frame 12 and the lift arm 34 to pivot the lift arm 34. In a further embodiment, the remote end 49 of the lift arm is joined, for example, pivotally, to the frame assembly 12 between the wheel assemblies 18 and 20 to provide a compact assembly. In this manner, the front wheel assembly 18 is disposed between the lift arm 34 and the lift cylinder 32. Use of a single lift cylinder 32 in the center of the wheeled work machine 10 also minimizes any damage thereto.

In the embodiment illustrated, a quick attachment interface member or assembly 50 is provided at the remote end of the lift arm 34 forward of the operator platform 26, which is a far more convenient position of the tool at the end of the lift arm 34. The quick attachment interface 50 has been utilized extensively by Bobcat Company and sold under the trade name BOB-TACH. The interface assembly 50 allows quick attachment of various work tools such as buckets, grapples, brooms, augers or the like. In this manner, by including the interface 50, the work machine 10 can readily accept and many of the various types of work tools currently in use or developed in the future.

Figure 5:
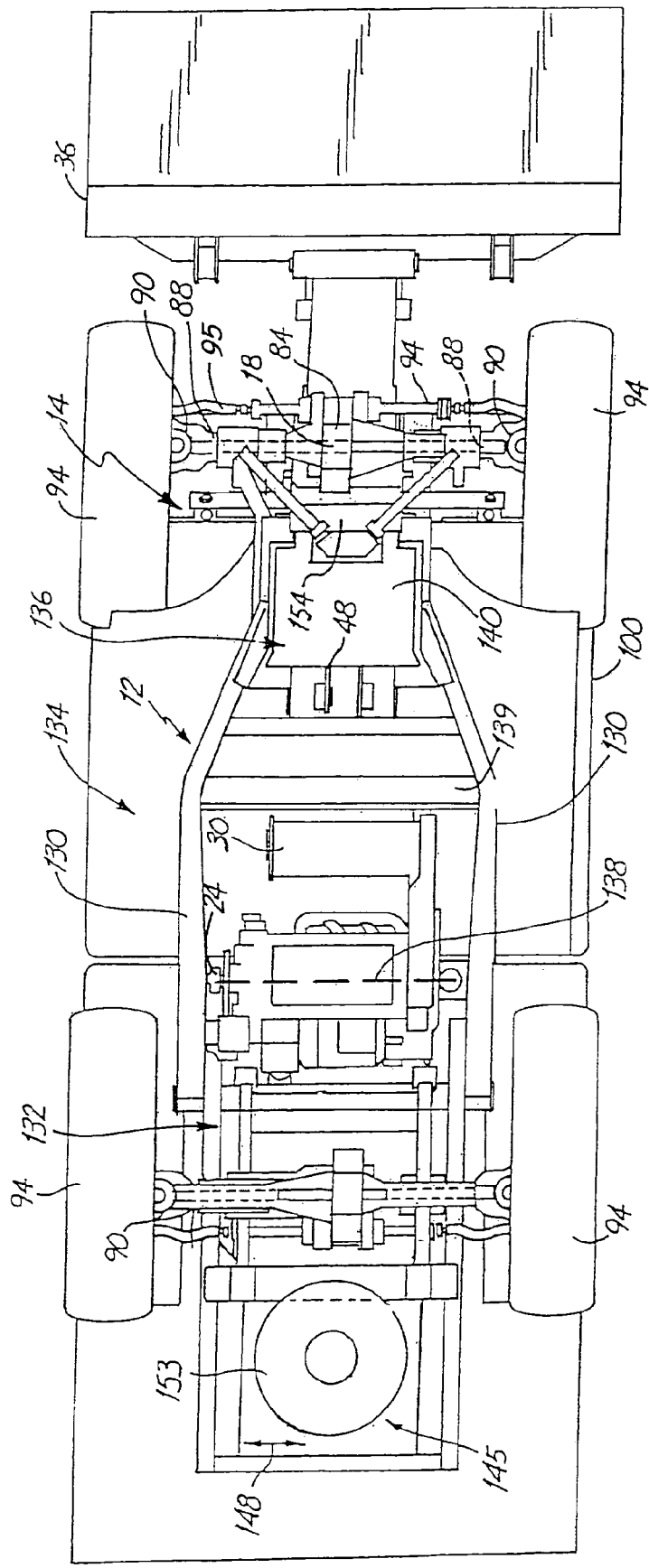
FIG. 5 is a bottom plan view of the wheeled work machine.

Referring to FIGS. 3 and 5, movement of the work machine 10 is provided by wheels 94 mounted on each of the wheel assemblies 18 and 20. Either or both of the wheel assemblies 18 and 20 can be powered by the engine 24, for example, by mechanical drive shafts, chains, belts or the like. In the embodiment illustrated, hydraulic drive motors are mounted to the housing assemblies 84, which in turn, drive the wheels 94. The drive housing assemblies 84 can be independent, i.e., one for any chosen wheel 94, or as illustrated, have opposed output shafts 88 to drive a pair of wheels 94.

The drive housing assemblies 84 can include gear reduction, wet disk brake, differential, differential lock and the output shafts 88. In one embodiment as illustrated, pivotal couplings 90 are provided at the ends of the drive housing assemblies 84 and are coupled to hub assemblies of the wheels 94 to allow the associated wheels 94 to pivot. Tie rods 95 coupled to a suitable steering mechanism having a steering wheel 98 (FIG. 1) proximate the operator platform 26 can control pivotal motion of the wheels 94. In the embodiment illustrated, each of the wheel assemblies 18 and 20 allow the corresponding wheels 94 to be pivoted providing for all-wheel steering capability resulting in a small turning diameter. Nevertheless, in an alternative embodiment, the steering mechanism can be coupled to only the front wheel assembly 18, or to only the rear assembly 20.

The steering mechanism for the front and/or rear wheels 94 can take any number of forms such as a mechanical linkage between the steering wheel 98 and the steerable wheels of the front wheel assembly 18 and/or rear wheel assembly 20. In the embodiment illustrated, the wheels are steered using hydraulic cylinders mounted to the drive housings. There can be a steering cylinder for each steerable wheel, or pairs of wheels can be steered with a single cylinder and a tie rod connection. The steering wheel 98 can be coupled to a steering sector to direct pressurized hydraulic fluid to the appropriate steering cylinders thus obtaining steering of the desired wheels. The steering modes can illustratively include front wheel steer, rear wheel steer, coordinated steer (in which the front and rear wheels are steered in pairs in opposite directions to implement tighter turns) and crab steer (in which the front rear wheels are again steered in pairs but in the same direction). A control valve can be further used in the hydraulic circuit of the rear wheels, wherein the control valve receives an input related to the type of steering desired for the rear wheels, e.g. coordinated or crab steer, and properly directs pressurized to the steering actuator based on the desired mode of steering. Allowing the work machine 10 to steer all of the wheels 94 significantly minimizes damage to the ground surface, which can occur during travel to the work site or operation of the work machine 10 at the job site.

In one embodiment, multiple seat positions can be provided through individual seats, as illustrated, or a common bench seat. Configured in this manner, the work machine 10 allows side-by-side seating positions for the transportation of one or two individuals to the job site. It should be further noted that the operator platform 26 is disposed on the frame assembly 12 between the wheel assemblies 18 and 20 so as to provide a stable platform. In the embodiment illustrated, the operator platform 26 forms part of an operator station 100 that can include a canopy 102.

An instrument cluster and dash 110 (FIG. 1) is generally disposed in front of the operator platform 26 and behind the boom pivot 16 and includes gauges, controls and the like for operation of the work machine 10. The instrument cluster and dash 110 is also disposed at a level such that an upper surface thereof allows an operator of height in the range of a female in the fifth percentile to a male in the ninety-fifth percentile to view an end of the lift arm 34 remote from the boom pivot 16.

The cargo support 28 located behind the operator platform 26 and supported by the frame assembly 12 allows the transportation of tools and/or other material to the job site. Although exemplified herein as a cargo box (open or enclosed), which can also tilt through a suitable lift cylinder and hinge coupling the cargo box to the frame assembly 12, which has a floor 120 and side walls 122 (with or without tailgates or side gates), the cargo support 28 can include other forms of containers or platforms. For instance, the cargo support can also include a sprayer having a suitable tank for containing liquid, a hopper such as for spreading sand, or a plurality of tool boxes to name a few.

Referring to FIGS. 2 and 5, engine 24 is generally located behind operator platform 26 and below cargo support 28. In one embodiment, a transverse engine is supported by the frame assembly 12 at this location. The transverse engine 24 includes a crank shaft indicated by dashed line 138 oriented transversely with respect to a longitudinal axis (front to back) of the work machine 10. Although other orientations of engine 24 can be used, the transverse engine provides a compact assembly that can also be easily serviced.

Figure 4:
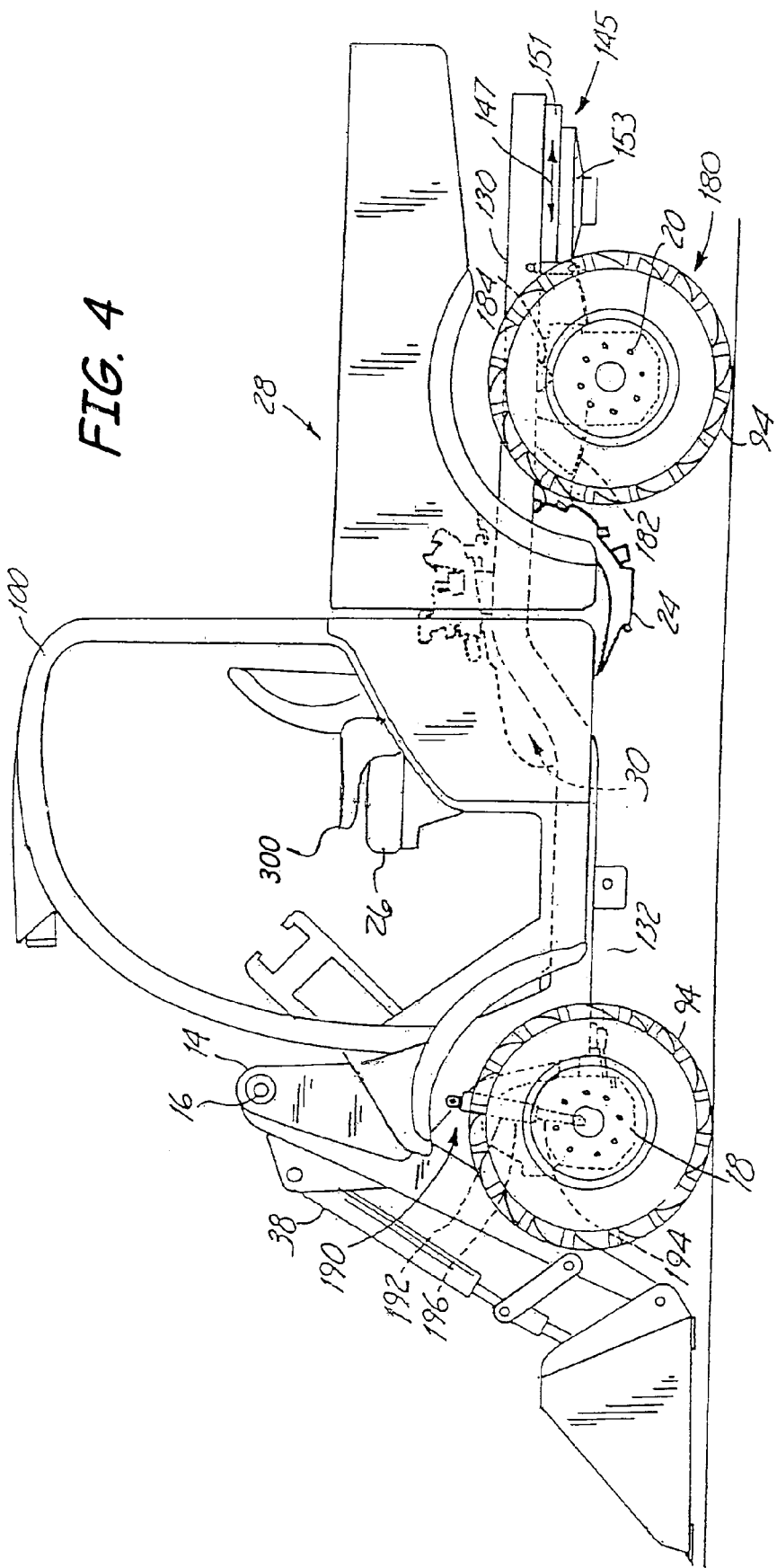
FIG. 4 is a side elevational view of the wheeled work machine with portions shown with dashed lines.

Also shown in FIGS. 2, 4 and 5 is a radiator assembly 145 for cooling engine 24. Radiator assembly 145 is supported at least partially beneath cargo support 28 by longitudinal frame members 130. In one embodiment, longitudinal frame members 130 are C-channel frame members. In these embodiments, radiator assembly 145 can be supported via positioning between, and within the C-channels of, frame members 130.

In the embodiment illustrated, radiator assembly 145 is supported by longitudinal frame members 130 behind the rear axle. This is shown in FIGS. 2, 4 and 5 by placement of the radiator assembly behind rear wheel 94 or suspension assembly 180.

Radiator assembly 145 includes a radiator 151 and optionally one or more air flow generation device 153 such as a fan or other blower for removing heat energy by moving air past radiator 151. In the illustrated embodiments, radiator assembly 145 includes dual fans or air flow generation devices 153, with one positioned on top of radiator 151, and one positioned below radiator 151. In other embodiments, radiator assembly 145 and air flow generation devices 153 can be positioned elsewhere. Radiator assembly 145 also includes hoses 146 which carry coolant between engine 24 and radiator 151. Also, radiator assembly can include other features, for example an airflow redirecting structure or mechanism which redirects airflow from fans 153 toward the rear of the wheeled work machine in order to minimize dust in the area of operator station 100.

Radiator 151 is supported relative to longitudinal frame members 130 and the ground in a "flat" position in order to further facilitate the compact design of wheeled work machine 10. In other words, radiator 145 has a vertical dimension relative to the ground which is less than its longitudinal dimensions indicated generally at 147 and 148 in FIGS. 2, 4 and 5. Generally, radiator 151 is oriented with its longitudinal dimensions substantially parallel to the ground to give it a low profile. However, radiator 151 can also be oriented at slight angles relative to the ground, for example up to about 45° or less to create the exhaust. Including a flat radiator 151 for cooling of engine 24 allows the radiator to be supported by longitudinal frame members 130 beneath cargo support 28. In addition to saving space and facilitating a compact and stable wheeled work machine configuration, utilization of a flat radiator assembly 145 placed in this position can also serve to protect the radiator from damage relative to other potential locations on the wheeled work machine.

Figure 6:
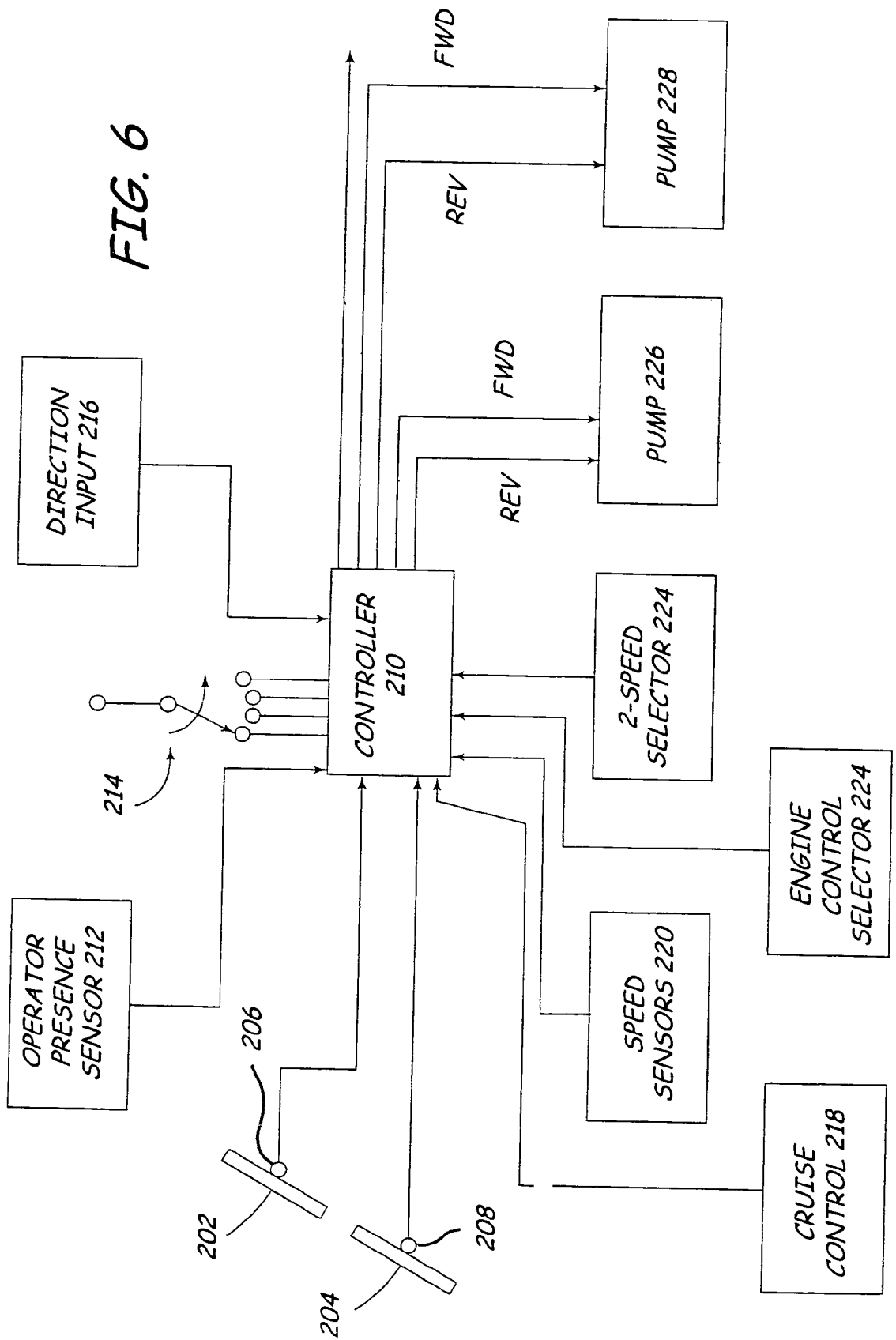
FIG. 6 is a block diagram of a control system.

FIG. 6 is a block diagram of a control system 200 for controlling a wheeled work machine, such as work machine 10. Control system 200 illustratively includes acceleration pedal 202, deceleration pedal 204, angle sensors 206 and 208 which are configured to sense the angle of deflection of pedals 202 and 204, respectively, and provide signals indicative thereof to controller 210. System 200 also includes an operator presence sensor 212, mode selector switch 214, direction input 216 which provides an input indicative of a desired direction of travel, cruise control select button 218, speed sensors 220 which are mounted to sense the speed of the front and/or rear wheels (or right and left wheels or one or all wheels), engine speed control mode selector 222, two speed selector 224, hydrostatic pump 226 for driving a hydraulic motor connected to the front wheels, and hydrostatic pump 228 for driving a hydraulic motor connected to the rear wheels.

A brief overview of the operation of control system 200 is first presented. In operation, the user depresses acceleration pedal 202 to a desired deflection angle. That angle is sensed by angle sensor 206 and a signal indicative thereof is provided to controller 210. Controller 210 associates the deflection angle with a predetermined speed and provides an output to hydrostatic pumps 226 and 228 to drive the wheels of work machine 10 at the desired speed. Speed sensors 220 provide a signal indicative of the speed of the wheels to controller 210 such that controller 210 can operate in a closed loop manner.

As the user deflects pedal 202 to a greater or lesser deflection angle, that angle is again sensed by sensor 206 and provided to controller 210 which, in turn, controls hydrostatic pumps 226 and 228 to increase or decrease wheel speed accordingly.

Similarly, the user can rotate deceleration pedal 204 to a desired angle of deflection which is sensed by sensor 208. Sensor 208 provides a signal indicative thereof to controller 210. Controller 210 associates the deflection angle of pedal 204 with a predetermined rate of deceleration. In one illustrative embodiment, as the deflection angle of pedal 204 increases, the rate of deceleration increases.

Of course, machine 10 is also capable of traveling both in forward and reverse directions. The user can indicate this by selecting the direction through direction input 216. Direction input 216 may, illustratively, simply be a rocker switch, a rotary switch, a press button switch, etc. The direction input 216 provides a signal to controller 210 indicative of a desired forward or reverse direction of movement of the machine, and controller 210 controls hydrostatic pumps 226 and 228 accordingly, based upon the deflection angles of pedals 202 and 204.

Two speed selector 224 is also illustratively a user actuated switch, button, etc., which provides a signal to controller 210 indicative of actuation thereof. In this way, the user can select between operating in a high speed or a low speed mode. Of course, the user may also select between more than two modes, but only two are described herein for the sake of brevity. If the user selects a high speed mode through input 224, then maximum deflection of pedal 202 is associated with one maximum speed. However, when the user selects a low speed mode through input 224, then the maximum deflection angle of pedal 202 is associated with a second maximum speed, which is lower than the first maximum speed.

In accordance with one illustrative embodiment, the user can also control the speed in cruise control mode through cruise control actuator 218. As with the other user actuable inputs, actuator 218 can also be a switch of various types or a depressible button, etc. When this button is depressed, controller 210 controls hydrostatic pumps 226 and 228 to maintain the current speed of machine 10.

Controller 210 can also control the speed of the machine 210 independently of engine speed. For example, the engine powers pumps for a hydraulic power system which may power attachments to machine 10. If the user desires to slow the vehicle to a slower speed, but does not wish to reduce power to the attachments, then the user may not wish to have the engine speed slowed as well. In that case, the engine speed is controlled by a separate throttle. Therefore, the user can provide an input through actuator 222 indicating to controller 210 whether the user wishes controller 210 to control engine speed in accordance with vehicle travel speed. In order to do so, controller 210 provides an output signal to a commercially available electrically controlled engine to vary the engine speed as desired by the user.

In still another embodiment, controller 210 can be configured to control machine 10 in one of a variety of steering modes briefly mentioned earlier. In one illustrative embodiment, the wheels are independently steerable, or are steerable in pairs. In that instance, machine 10 can be steered in front wheel steer mode in which the front wheels are steered, rear wheel steer mode in which the rear wheels are steered, crab mode in which the front and rear wheels are all steered in the same direction, and coordinated steer mode in which the front and wheel are steered in opposite directions to accommodate tighter turns. In one illustrative embodiment, the operator can select the steering mode with mode selector switch 214 which is illustrated as a rotary switch, but can take the form of any desired operator input.

OPERATOR SENSOR

Control system 200 also illustratively incorporates operator presence sensor 212. Operator presence sensor 212 can be configured in any number of known ways, including the user actuated embodiment illustrated in FIGS. 7A–7E, to sense the presence of an operator in the operator compartment of machine 10 and provide a signal to controller 210 indicative thereof. In one illustrative embodiment, certain functions of machine 10 can be enabled or locked out based on the signal from operator presence sensor 212.

Figure 7A:
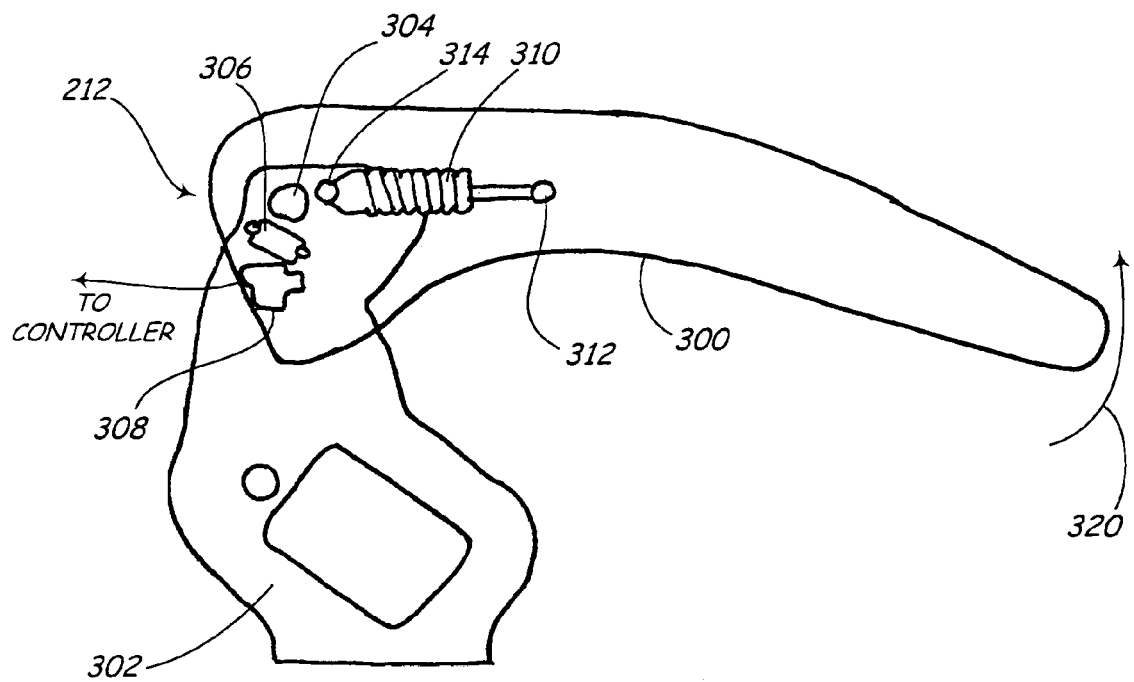
FIG. 7A is a side view of an operator presence sensor assembly in accordance with an embodiment of the present invention.

FIGS. 7A–7E illustrate one embodiment of an operator presence sensor assembly 212. FIG. 7A shows an armrest 300 connected to a portion of seat support or mounting bracket 302. Armrest 300 is pivotally connected to support 302 at pivot point 304. Armrest 300 also carries a magnet 306, and support 302 has connected thereto a magnetic sensor (such as a Hall-effect sensor or other type of sensor) 308. A spring 310 is coupled to armrest 300 at point 312 and to support 302 at point 314. Armrest 300 is pivotable about pivot point 304 in the direction indicated by arrow 320.

When armrest 300 is in the downward or operating position shown in FIG. 7A, magnet 306 is in close proximity to Hall-effect sensor 308 such that Hall-effect sensor 308 provides a signal to controller 210 indicating that armrest 300 is in the operating position.

Figure 7B:
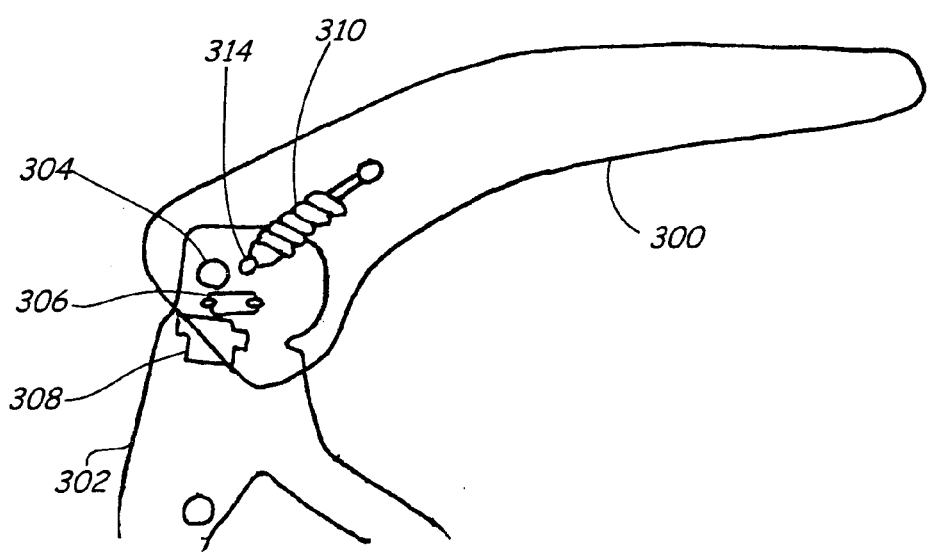
FIG. 7B is a side view of an operator presence sensor assembly in accordance with an embodiment of the present invention.

However, armrest 300 can also pivot upwardly in the direction indicated by arrow 320. FIG. 7B illustrates armrest 300 pivoted slightly upwardly to a sensor deactivation angle. In the position shown in FIG. 7B, magnet 306 is pivoted far enough away from sensor 308 such that sensor 308 provides a signal to the controller 210 indicating that the armrest is in the raised position.

Figure 7C:
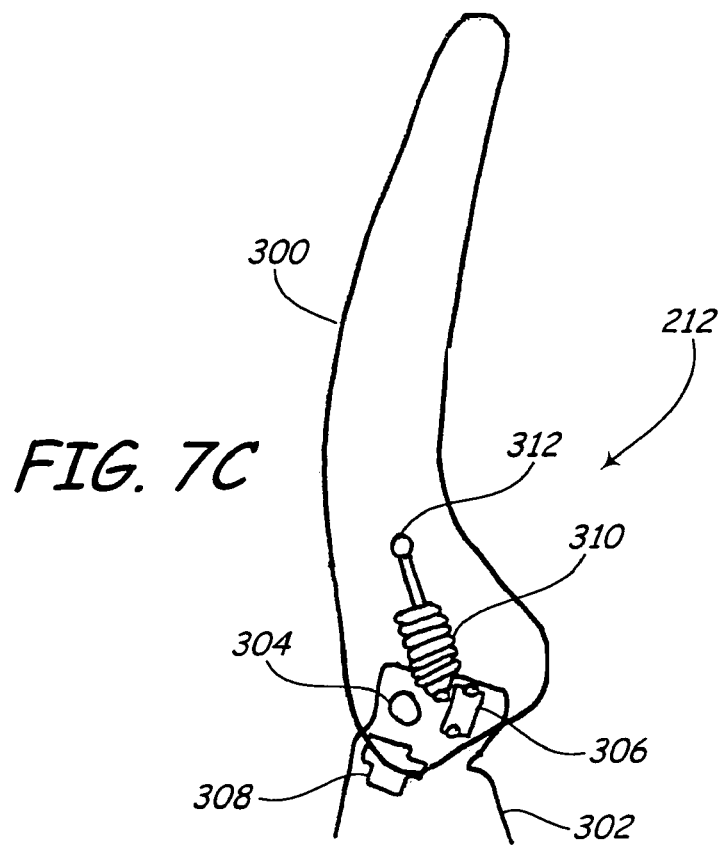
FIG. 7C is a side view of an operator presence sensor assembly in accordance with an embodiment of the present invention.

In one embodiment, spring 310 is in an over center arrangement. The deactivation angle shown in FIG. 7B illustratively corresponds to the spring line of action such that, if armrest 300 is pivoted upwardly any further, spring 310 biases armrest 300 into the raised position shown in FIG. 7B and, if armrest 300 is pivoted downwardly any further from the position shown in FIG. 7B, spring 310 biases it into the lowered position shown in FIG. 7A. FIG. 7C shows armrest 300 in the fully raised position. Again, magnet 306 is removed from sensor 308 such that sensor 308 provides the signal indicating that the sensor is still deactivated.

Figure 7D:
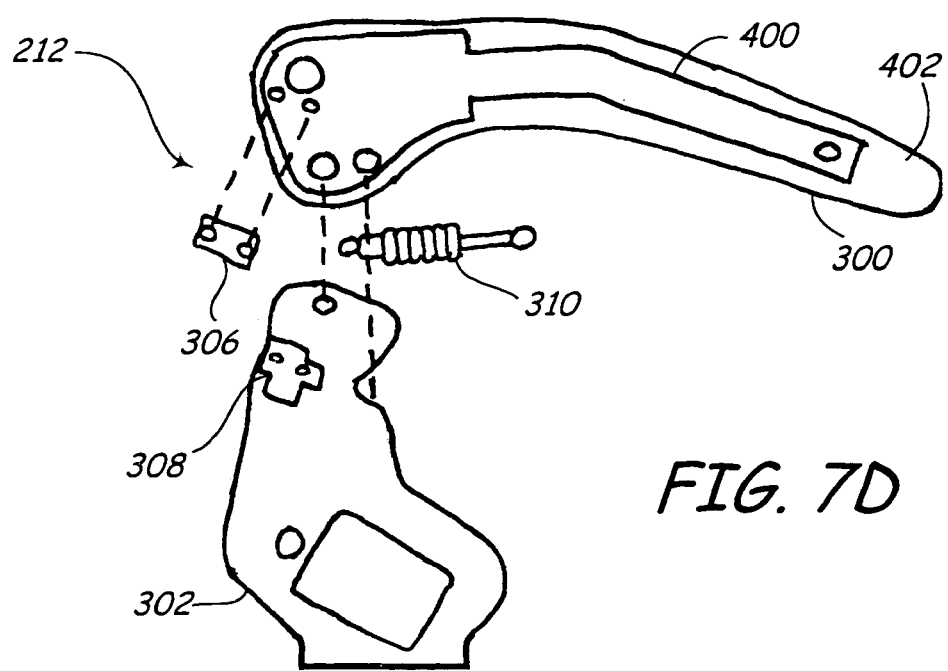
FIG. 7D is an exploded side view of an operator presence sensor assembly in accordance with an embodiment of the present invention.
Figure 7E:
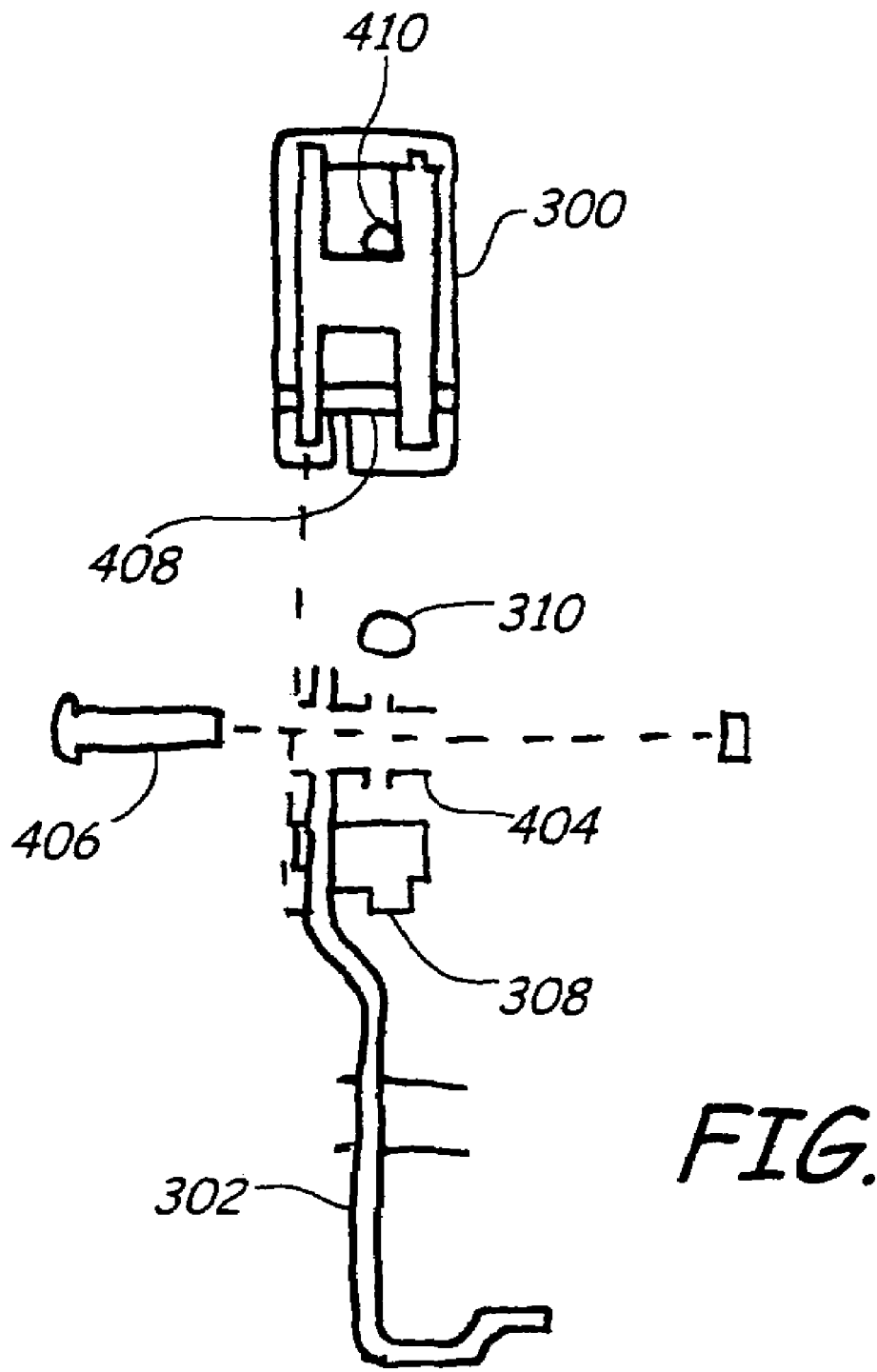
FIG. 7E is an exploded side view of an operator presence sensor assembly in accordance with an embodiment of the present invention.

FIGS. 7D and 7E illustrate exploded views of operator presence sensor assembly 212 in accordance with one embodiment of the present invention. FIG. 7D shows that armrest 300 includes an inner structural member 400, such as a tube or metal rod, covered by a foam material 402. FIGS. 7D and 7E illustrate that support bracket 302 includes a pivot bushing 404 that receives a connector 406 which also fits through axial bore 408 in armrest 300. Armrest 300 also includes a structural member that contains a guide hole 410 for receiving the end of spring 310. Operator presence sensor assembly 212 can be mounted to a rigid seat or a suspension seat.

Although the present invention has been described with reference to preferred embodiments, workers skilled in the art will recognize that changes may be made in form and detail without departing from the spirit and scope of the invention.

What is claimed is:

1. A control system for a work machine comprising:
 an operator platform including an operator seat;
 an operator actuable input assembly including a mounting bracket attached to the operator seat and an armrest pivotally coupled to the mounting bracket at a pivot point, wherein the armrest is positioned on a first side of the operator seat and is actuable independently of any other armrest positioned on a second side of the operator seat;
 a sensor coupled to the input assembly and configured to provide a signal indicative of operator presence on the operator platform;
 a controller operably coupled to the sensor and configured to receive the signal provided by the sensor, the controller further configured to manipulate a function of the work machine based on the signal.

2. The control system of claim 1, wherein the armrest includes a magnet.

3. The control system of claim 2, wherein the armrest is in an operating position if the magnet is in close proximity to the sensor.

4. The control system of claim 3, wherein the armrest is perpendicular to the mounting bracket and parallel to the operator platform in the operating position.

5. The work machine of claim 2, wherein the armrest is in a non-operating position if the magnet is out of proximity from the sensor.

6. The control system of claim 4, wherein the armrest is pivoted in a direction upwards from the operating position when the armrest is in the non-operating position.

7. The control system of claim 2 and further comprising a spring coupled to the armrest and configured to bias the armrest to an operating position and a non-operating position.

8. The control system of claim 1, wherein the sensor comprises a magnetic sensor.

9. The control system of claim 8, wherein the magnetic sensor comprises a Hall-effect sensor.

10. The control system of claim 1, wherein the at least one function is enabled and disabled by the controller.

11. A work machine comprising:
 a rigid frame;
 a cab coupled to the rigid frame and defining an operator compartment, the operator compartment including an operator platform having an operator seat;
 a mounting bracket coupled to a portion of the operator seat;
 an armrest pivotally coupled to the mounting bracket at a pivot point, wherein the armrest is positioned on a first side of the operator seat and is actuable independently of any other armrest positioned on a second side of the operator seat; and
 a sensor included in the mounting bracket, the sensor configured to sense operator presence on the operator platform and configured to provide a signal indicative thereof.

12. The work machine of claim 11 and further comprising a controller operably coupled to the sensor and configured to receive the signal provided by the sensor, wherein the controller manipulates at least one function of the work machine based on the received signal.

13. The work machine of claim 12, wherein the at least one function enables and disables the controller.

14. The work machine of claim 11, wherein the sensor senses operator presence on the operator platform if the armrest is configured in an operating position.

15. The work machine of claim 11, wherein the sensor senses an empty operator platform if the armrest is configured in a non-operating position.

16. The work machine of claim 11, wherein the armrest includes a magnet.

17. The work machine of claim 16, wherein the armrest is configured in an operating position if the magnet is in close proximity to the sensor.

18. The work machine of claim 17, wherein the armrest is configured in a non-operating position if the magnet is out of proximity from the sensor.

19. The work machine of claim 11 and further comprising a spring coupled to the armrest and configured to bias the armrest in an operating position and a non-operating position.

* * * * *

UNITED STATES PATENT AND TRADEMARK OFFICE
CERTIFICATE OF CORRECTION

PATENT NO. : 7,159,684 B2  Page 1 of 1
APPLICATION NO. : 10/715627
DATED : January 9, 2007
INVENTOR(S) : Jeffrey A. Dahl et al.

It is certified that error appears in the above-identified patent and that said Letters Patent is hereby corrected as shown below:

Title Page, Item (56) References Cited, Foreign Documents
Please add --0 389 262 A2 21.09.90 Europe--; --WO 02/46856 A1 PCT 13.06.02-- and --09059322 Japan 13.03.97--.

Signed and Sealed this

Tenth Day of April, 2007

JON W. DUDAS
*Director of the United States Patent and Trademark Office*